United States Patent [19]

Seifried

[11] 4,075,870
[45] Feb. 28, 1978

[54] RADIALLY SHIFTABLE GEAR FOR SPEED-CHANGING MECHANISM

[75] Inventor: Alfred Seifried, Friedrichshafen, Germany

[73] Assignee: Zahnradfabrik Friedrichshafen AG, Friedrichshafen, Germany

[21] Appl. No.: 620,219

[22] Filed: Oct. 6, 1975

[30] Foreign Application Priority Data

Oct. 5, 1974 Germany ............................ 2447582

[51] Int. Cl. ............................................... F16H 1/26
[52] U.S. Cl. .................................... 64/9 R; 64/27 B; 64/27 R; 74/325
[58] Field of Search .................. 74/325, 331, 49, 410, 74/411, 640; 64/15 B, 27 B, 27 R

[56] References Cited

U.S. PATENT DOCUMENTS

| 2,729,077 | 1/1956 | Holloway | 64/27 B |
|---|---|---|---|
| 2,841,000 | 7/1958 | Parks et al. | 64/27 B |
| 3,406,583 | 10/1968 | Baier | 74/411 |
| 3,802,293 | 4/1974 | Winckler | 74/331 |

FOREIGN PATENT DOCUMENTS 98,397  3/1940  Sweden ............................. 64/27 B

*Primary Examiner*—Samuel Scott
*Assistant Examiner*—R. C. Turner
*Attorney, Agent, or Firm*—Karl F. Ross

[57] ABSTRACT

Two coaxial main shafts are the output and the input of a variable-speed-ratio transmission wherein a transfer gear on one of these shafts is in permanent mesh with a plurality of coacting gears on respective ancillary shafts paralleling the main shafts, each ancillary shaft also carrying one or more speed-changing gears in permanent mesh with one or more associated gears mounted idle on the other main shaft and adapted to be selectively clutched thereto. The transfer gear has an annular body with external teeth which surrounds its supporting shaft with clearance, a flexible ring being disposed in that clearance with freedom of limited radial deformation and in positive engagement with both the shaft and the gear body to interconnect them for joint rotation. Teeth or other coupling formations on the inner and outer ring surfaces, peripherally offset from one another and separated by freely deformable ring sections, engage complementary formations on the shaft and within the gear body, respectively.

4 Claims, 4 Drawing Figures

RADIALLY SHIFTABLE GEAR FOR SPEED-CHANGING MECHANISM

FIELD OF THE INVENTION

My present invention relates to a gear transmission wherein a main shaft is permanently coupled with two or more ancillary shafts, peripherally arrayed about that main shaft, by means of a transfer gear on the main shaft meshing with coacting gears on all the ancillary shafts. Such transmissions are used, for example, in speed-changing mechanisms wherein the main shaft is one of two coaxial shafts journaled in fixed bearings, one of these coaxial shafts being the input and the other being the output of the transmission. The two main shafts can be drivingly interconnected with different speed ratios, directly or via trains of permanently meshing gears on the second main shaft and on the ancillary shafts, by means of selectively operable clutches.

BACKGROUND OF THE INVENTION

The transfer gear, which distributes the torque of the input shaft over the several ancillary shafts or conversely concentrates the torques of the latter shafts on the output shaft, is subject to radial stresses due to unavoidable manufacturing tolerances. To relieve these stresses, it has already been proposed (see German printed specification No. 1,031,075) to mount the transfer gear floatingly on its shaft and to maintain its radial position solely by the interplay of its teeth with those of the coacting gears; torque is transmitted between the shaft and the gear by a toothed coupling sleeve. German published specification No. 1,775,944 describes a similar arrangement.

In these prior systems the coupling members linking the floating transfer gear with its shaft must be free to position themselves skew to the shaft axis to facilitate the necessary radial displacement of the gear. If space limitations restrict the permissible play between the torque-transmitting teeth of the coupling, the relative axial displacement between these teeth generates considerable friction under load so as to impede the stress equalization and to result in rapid wear.

OBJECT OF THE INVENTION

The object of my present invention, therefore, is to provide a compact mounting for such a transfer gear facilitating its radial displacement while avoiding the aforestated drawbacks.

SUMMARY OF THE INVENTION

I realize this object, in accordance with my present invention, by designing the transfer gear as an externally toothed annular body surrounding the associated main shaft with clearance, a flexible ring substantially coaxial with the shaft being disposed in that clearance and having peripherally spaced outer and inner coupling formations positively engaging respective complementary formations on the inner surface of the gear body and on the outer shaft surface whereby the shaft and the body are interconnected for joint rotation. The coupling formations are separated by ring sections which are freely deformable in the aforementioned clearance.

These coupling and coacting formations may be sets of teeth extending over limited peripheral zones or segments, preferably four such zones equispaced along the circumference of the ring with inner and outer teeth alternating to form two diametrically opposite pairs. Especially in the latter instance these teeth may be of generally parallelogrammatic outline, with mutually perpendicular flanks to permit relative shifting in two orthogonal dimensions as in a conventional Oldham coupling. Teeth of the more common involute shape, however, may also be used and have the advantage of greater compactness and structural strength.

Alternatively, the coupling ring according to my invention may have the shape of a scalloped band of substantially constant thickness. Such a ring may be readily mass-produced by slicing an extruded tubular profile of corresponding shape.

BRIEF DESCRIPTION OF THE DRAWING

My invention will now be described in greater detail with reference to the accompanying drawing in which.

SPECIFIC DESCRIPTION

Figure 4:
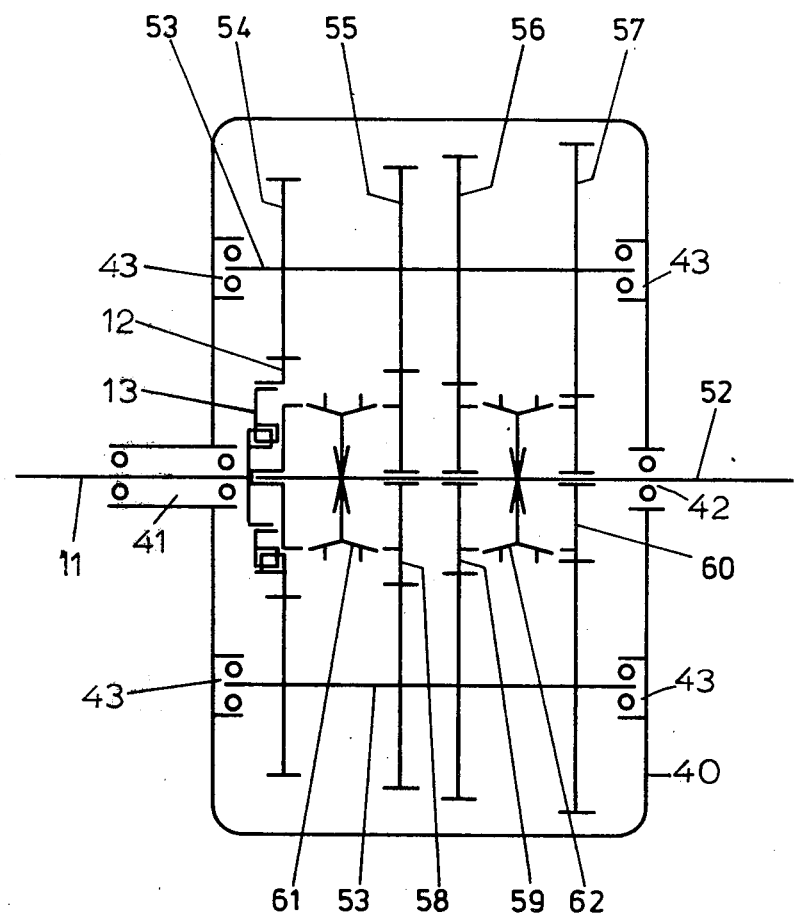
FIG. 4 is a diagrammatic representation of a variable-speed-ratio transmission incorporating my improved gear mounting.

Reference will first be made to FIG. 4 showing a speed-changing mechanism with two coaxial main shafts, i.e. an input shaft 11 and an output shaft 52 journaled in radially fixed bearings 41, 42 of a transmission housing 40. Similar bearings 43 support at least two ancillary shafts 53 parallel to shafts 11, 52 and symmetrically arrayed thereabout. Keyed to each shaft 53 are four speed-changing spur gears 54, 55, 56, 57 of different diameters, gears 55 – 57 being in permanent mesh with respective gears 58, 59, 60 which are freely rotatable on shaft 52. Gears 54 permanently engage a transfer gear 12 mounted on shaft 11, for joint rotation therewith, by a coupling ring 13 as more fully described hereinafter.

A clutch 61 can be selectively shifted to the left or to the right from its illustrated neutral position to interconnect the shafts 11 and 52 either directly or via gears 12, 54, 55, 58. Similarly, a clutch 62 may be shifted to interconnect these two shafts by way of gears 56, 59 or 57, 60. Thus, four different speed ratios may be established between these shafts, with progressive step-up upon intervention of gears 58 – 60. Naturally, the gear diameters could be changed to provide a step-down rather than a step-up transmission; also, shaft 52 may be driving and shaft 11 may be driven.

Figure 1:
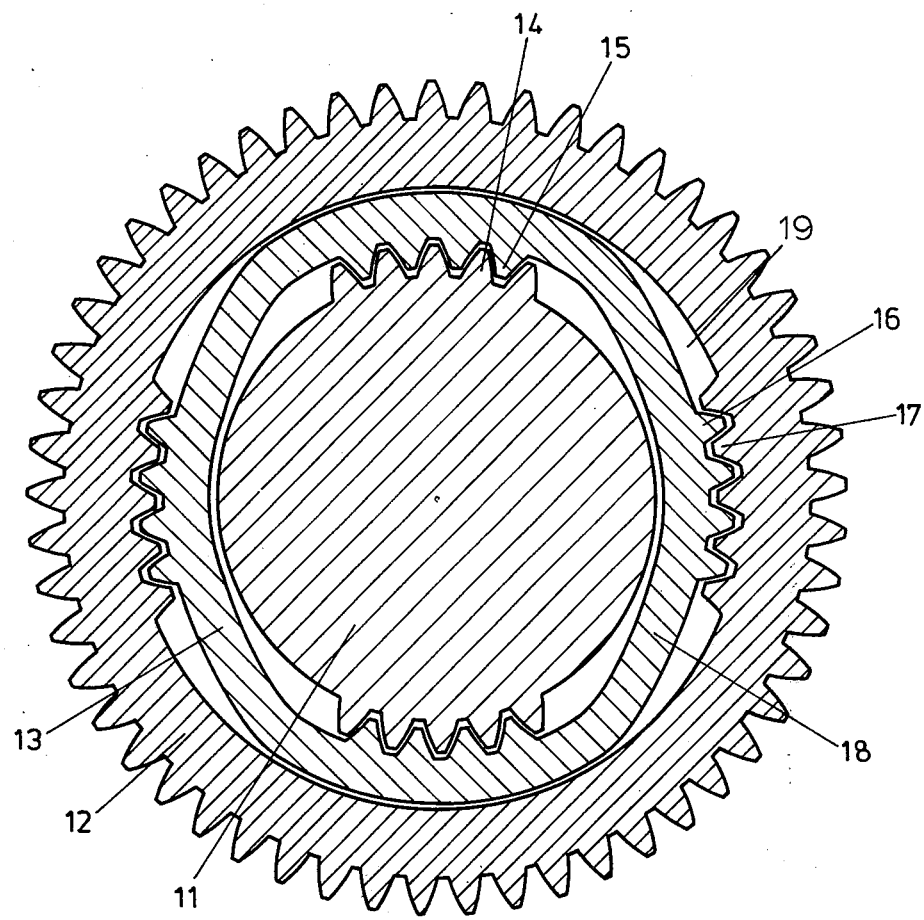
FIG. 1 is a cross-sectional view of a shaft with associated transfer gear and coupling ring representing a first embodiment.

FIG. 1 shows details of shaft 11, gear 12 and ring 13. The gear 12 has an externally toothed annular body leaving a clearance 19 around the shaft 11, this clearance accommodating the flexible and eleastically deformable ring 13 whose radial thickness is substantially less than that of the gear body. Ring 13 has two diametrically opposite sets of inner teeth 15 and, at locations offset therefrom by 90°, two diametrically opposite sets of outer teeth 16, adjacent sets of teeth being peripherally separated by toothless ring sections 18 which are freely deformable in clearance 19. Inner teeth 15 mesh with complementary teeth 14 on the surface of shaft 11 whereas outer teeth 16 engage complementary teeth 17 on the inner surface of gear body 12. The teeth 14 – 17 have the common involute outline.

As clearly seen in FIG. 1, the unitary ring 13 is separated by arcuate gaps from gear 12 in the regions of inner coupling formations 15 and from shaft 11 in the regions of outer coupling formations 16 to allow for a certain relative radial mobility of the gear and the shaft.

Figure 2:
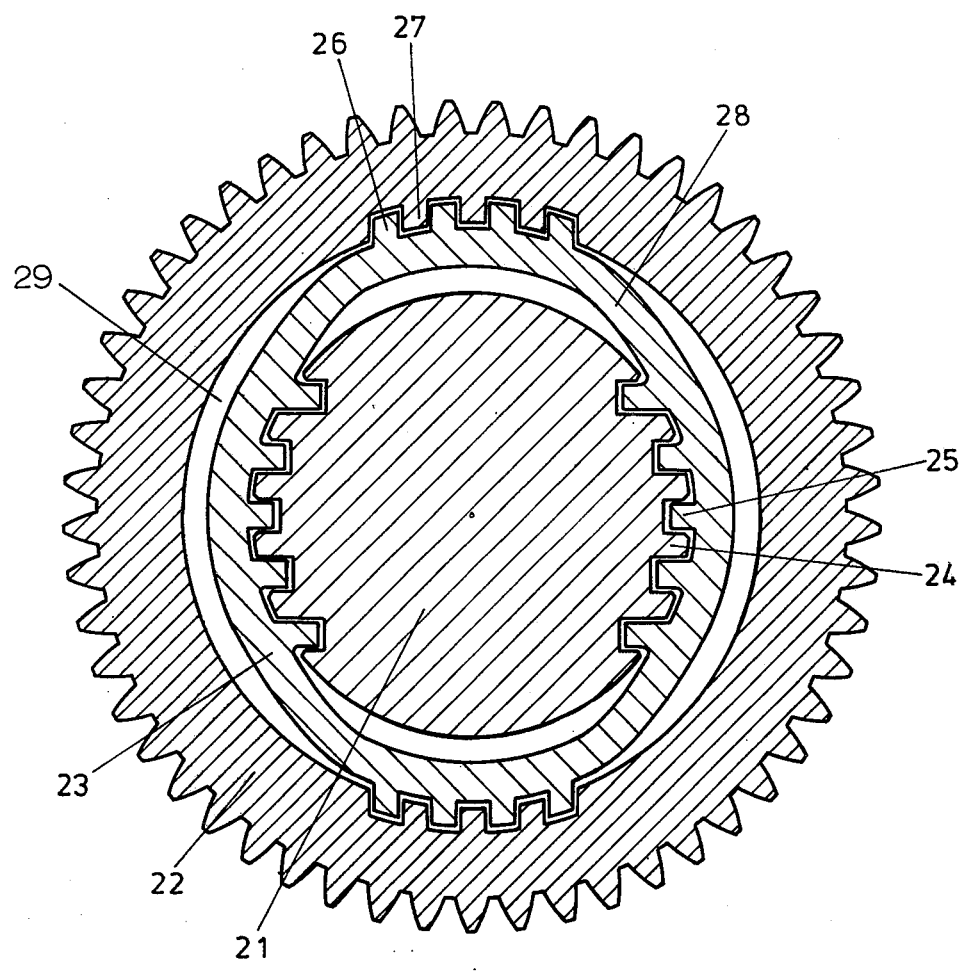
FIGS. 2 and 3 are views similar to FIG. 1, showing two further embodiments.

FIG. 2 shows a similar arrangement with a shaft 21, a transfer gear 22 defining therewith a clearance 29, and a coupling ring 23 having inner and outer teeth 25, 26 engaging teeth 24, 27 on the shaft and on the gear, the toothed ring portions being again separated by freely deformable toothless sections 28. In this instance, however, the teeth 24 – 27 have a substantially parallelogrammatic outline, the flanks of teeth 24, 25 being perpendicular to those of teeth 26, 27. This assembly functions in the general manner of the aforementioned Oldham coupling, aside from the deformability of the ring and especially of its intertooth sections 28, the relative slidability of the meshing teeth adding to the radial adjustability of the gear mounting.

Figure 3:
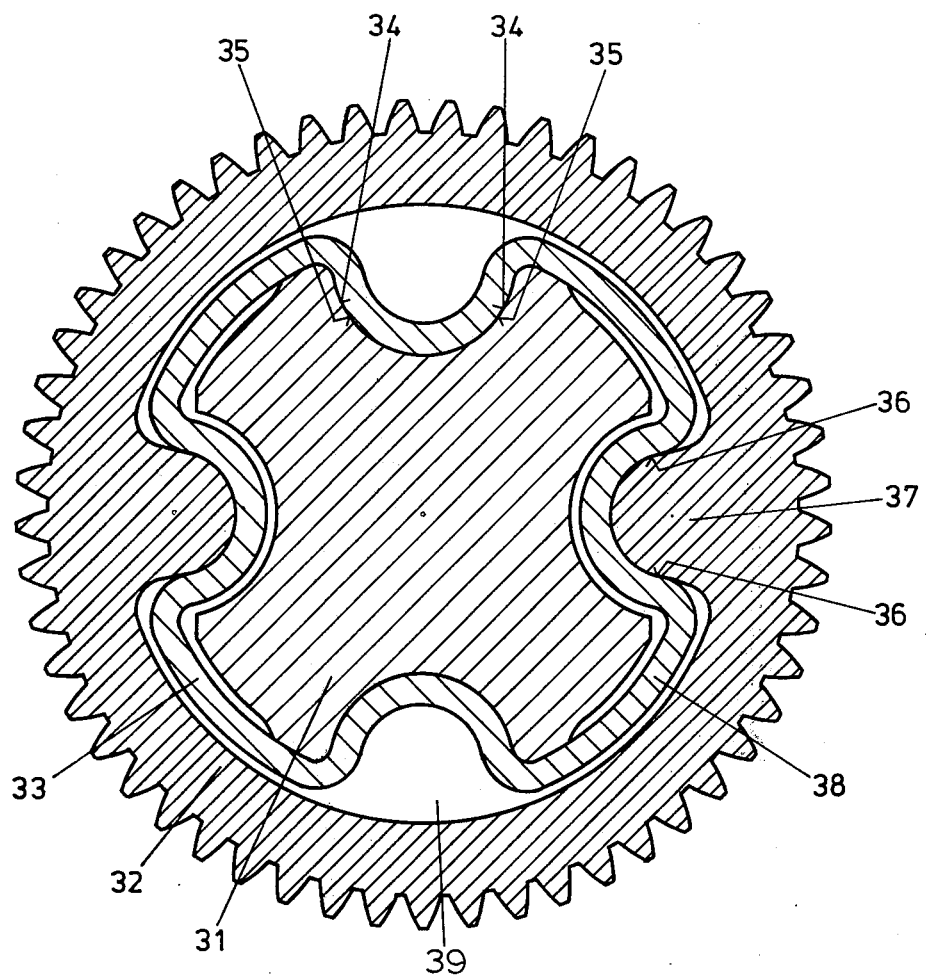

In FIG. 3 I have shown a shaft 31, a gear 32 and a coupling ring 33 again disposed in an intervening clearance 39. Ring 33 consists here of a scalloped band of approximately constant radial thickness with two inwardly directed lobes having inner surfaces 35 in contact with mating recesses 34 of the shaft and with two other such lobes whose outer surfaces 36 receive complementary bosses 37 on the inner gear surface. The lobes are separated by freely deformable ring sections 38. This arrangement could also be reversed, with one pair of outwardly projecting lobes extending into recesses on the inner gear surface and another pair of such lobes receiving ribs on the shaft surface. The substantially uniform thickness of ring 33 eliminates potential weak spots.

Again, as in the emodiments of FIGS. 1 and 2, the unitary ring 33 has a radial thickness which is smaller than the width of clearance 39 whereby gaps are provided in the regions of inner and outer coupling formations 35, 36 to facilitate relative radial displacement.

Naturally, assemblies 21 – 31 or 31 – 33 may be substituted for the shaft 11, gear 12 and ring 13 in FIG. 4. In each instance the transfer ring has considerable radial play but lacks axially protruding parts. There is also a certain amount of relative angular mobility which is advantageous if a pinion or gear with oblique teeth (e.g. a worm) is used for the torque transfer; such a gear may undergo a slight wobbling motion in compensating for the tolerances of the gear trains of which it forms part.

I claim:

1. In a gear transmission comprising a main shaft, a transfer gear on said main shaft, a plurality of ancillary shafts peripherally arrayed about said main shaft, and a coacting gear on each of said ancillary shafts in mesh with said transfer gear, the improvement wherein said transfer gear has an externally toothed annular body surrounding said main shaft with clearance, said clearance being occupied by a unitary elastic ring substantially coaxial with said main shaft and said body, said ring having a pair of diametrically opposite outer coupling formations and a pair of diametrically opposite inner coupling formations positively engaging respective complementary formations on the inner surface of said body and on the outer surface of said shaft whereby said body and said shaft are interconnected for joint rotation, said outer and inner coupling formations being peripherally offset from one another by 90° and separated by ring sections freely deformable in said clearance, the combined radial thickness of said ring and either of said coupling formations exceeding the width of the clearance at the respective coupling formation, thereby facilitating radial displacement of said transfer gear relative to said main shaft without disengagement of said coupling formation from said complementary formation.

2. The improvement defined in claim 1 wherein said coupling formations and complementary formations are teeth of generally parallelogrammatic outline, the teeth of one pair having flanks perpendicular to the flanks of the teeth of the other pair.

3. The improvement defined in claim 1 wherein said coupling formations and complementary formations are sets of involute teeth.

4. The improvement defined in claim 1 wherein said ring is a scalloped band of substantially constant radial thickness.

* * * * *